(12) United States Patent
Hsia

(10) Patent No.: US 6,755,435 B2
(45) Date of Patent: Jun. 29, 2004

(54) SPORTS UTILITY STROLLER

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 10/143,919

(22) Filed: May 13, 2002

(65) Prior Publication Data
US 2003/0209883 A1 Nov. 13, 2003

(51) Int. Cl.⁷ .................................................. B62B 7/10
(52) U.S. Cl. ..................... 280/649; 280/642; 280/47.38; 5/93.1
(58) Field of Search ................................ 280/649, 642, 280/647, 648, 650, 644, 641, 47.38, 42, 31; 5/93.1, 99.1, 98.1, 98.2

(56) References Cited

U.S. PATENT DOCUMENTS

| 2,013,910 | A | * | 9/1935 | Noodelijk | 280/642 |
| 2,225,999 | A | * | 12/1940 | Kroll et al. | 280/649 |
| 2,447,705 | A | * | 8/1948 | Macip | 280/642 |
| 3,421,774 | A | * | 1/1969 | Patterson | 280/642 |
| 4,019,757 | A | * | 4/1977 | Beger et al. | 280/649 |
| 4,077,640 | A | * | 3/1978 | Perego | 280/42 |
| 4,324,410 | A | * | 4/1982 | Perego | 280/42 |
| 4,506,907 | A | * | 3/1985 | Miyagi | 280/642 |
| 4,527,665 | A | * | 7/1985 | Shamie | 188/200 |
| 4,529,219 | A | * | 7/1985 | Shamie | 280/642 |
| 4,591,176 | A | * | 5/1986 | Kassai | 280/47.36 |
| 4,632,421 | A | * | 12/1986 | Shamie | 280/642 |
| 4,836,573 | A | * | 6/1989 | Gebhard | 280/644 |
| 4,907,818 | A | * | 3/1990 | Chai | 280/642 |
| 5,499,831 | A | * | 3/1996 | Worth et al. | 280/30 |
| 5,765,665 | A | * | 6/1998 | Cheng et al. | 188/20 |
| 5,871,227 | A | * | 2/1999 | Huang | 280/642 |
| 6,102,167 | A | * | 8/2000 | Chiu | 188/20 |
| 6,116,624 | A | * | 9/2000 | Hu | 280/47.371 |

* cited by examiner

Primary Examiner—Brian L. Johnson
Assistant Examiner—Jeffrey J. Restifo
(74) Attorney, Agent, or Firm—Raymond Y. Chan; David and Raymond Patent Group

(57) ABSTRACT

A sports utility stroller includes a boundary frame including a top and bottom frame to form a playpen cavity therebetween, a stroller frame including a pair of side frames, which supports two sides of the boundary frame, each including a first side frame leg and a second side frame leg pivotally connected with each other, and a pair of locking arrangements for securely locking up the two side frames so as to retain the boundary frame at an unfolded position, wherein at the unfolded position, a top frame is lifted up from the bottom frame to form the playpen cavity having a predetermined depth, and at a folded position, the first and second side frame legs are pivotally folded to drop the top frame towards the bottom frame, so as to minimize the depth of the playpen cavity.

15 Claims, 5 Drawing Sheets

SPORTS UTILITY STROLLER

BACKGROUND OF THE PRESENT INVENTION

1. Field of Invention

The present invention relates to baby's accessories and more particularly to a sports utility stroller, which can also selectively function as a transportable playyard, bassinet, or bed for accommodating babies or young children.

2. Description of Related Arts

Baby's accessories such as stroller, bassinet, playyard, and bed are known in art and become necessities to every family having a baby. Generally speaking, when babies grow up, their parents must purchase all kinds of baby's accessories for different purposes. For example, the stroller is considered as a convenient tool to transport the baby or young child during outdoor activities, such as foot traveling and shopping. The playyard is especially designed to restrict the movement of the baby or young child who is able to crawl or walk when the parents cannot always keep their eyes on their babies. However, it is unreasonable for the parents to buy all the baby's accessories at once, which is a waste of money.

When the parents accumulatively purchase the baby's accessories, such baby's accessories are bulky and occupy relatively large set-up spaces, and are therefore hardly appreciated and liked by city-dwellers. Even though such baby's accessories are constructed to have a foldable frame that are adapted to be folded into compact units for storage and carriage, the baby's accessories require large storage spaces. Moreover, it is a hassle for the parent to carry all the baby's accessories at once especially during outdoor activities such as camping.

Furthermore, for accommodating the baby comfortly, the parent may merely move the baby from the playyard to the bed while the baby is sleeping or move the playyard from the dinning room to the living room so that the parent can keep his or her eyes on the baby. In other words, in order to take good care of the baby, a parent not only should pay attention on his or her baby but also must have enough energy to carry all the baby's accessories around to accommodate the baby comfortly.

SUMMARY OF THE PRESENT INVENTION

A main object of the present invention is to provide a sports utility stroller, which can selectively function as a transportable playyard, bassinet, stroller, or bed for accommodating a baby or young child therein, so that the parents can save money from purchasing different products.

Another object of the present invention is to provide a sports utility stroller, which can be quickly and easily folded into a compact unit for carriage and storage and unfolded for use.

Another object of the present invention is to provide a sports utility stroller, which is specifically constructed to have a predetermined size such that the user is able to move the sports utility stroller room to room through the doors without folding up the sports utility stroller. In other words, the user is able to operate the present invention as an outdoor stroller to transport his or her baby as well as an indoor playyard or bed.

Another object of the present invention is to provide a sports utility stroller, wherein the folding operation of the sports utility stroller is easy and fast that any individual is able to unfold or fold up the sports utility stroller.

Another object of the present invention is to provide a sports utility stroller, wherein no expensive or complicate structure is employed in the present invention in order to achieve the above mentioned objects. Therefore, the present invention successfully provides an economic and efficient solution to baby accessories.

Accordingly, in order to accomplish the above objects, the present invention provides a sports utility stroller, which comprises:

a boundary frame, comprising:
  a bottom frame having a supporting surface;
  a top frame, defining a top opening, spaced apart from the bottom frame in a vertical direction;
  a boundary shelter supported by the top frame to define a playpen cavity within the boundary shelter, the top frame and the bottom frame; and a stroller frame, comprising:
  a pair of side frames, which supports two sides of the boundary frame, each comprising a first side frame leg and a second side frame leg pivotally connected with each other in a cross manner to form a pivotal "X" structure;
  a pair of front stroller wheels rotatably attached to two bottom ends of the first frame legs respectively;
  a pair of rear stroller wheels rotatably attached to two bottom ends of the second frame legs respectively; and
  a handle frame comprising two handle arms upwardly extended from the side frames respectively; and
  a pair of locking arrangements for securely locking up the two side frames so as to retain the boundary frame at an unfolded position, wherein at the unfolded position, the top frame is lifted up from the bottom frame to form the playpen cavity having a predetermined depth, and at a folded position, the first and second side frame legs are pivotally folded to drop the top frame towards the bottom frame, so as to minimize the depth of the playpen cavity.

DETAILED DESCRIPTION OF THE PREFERRED EMBODIMENT

Figure 1:
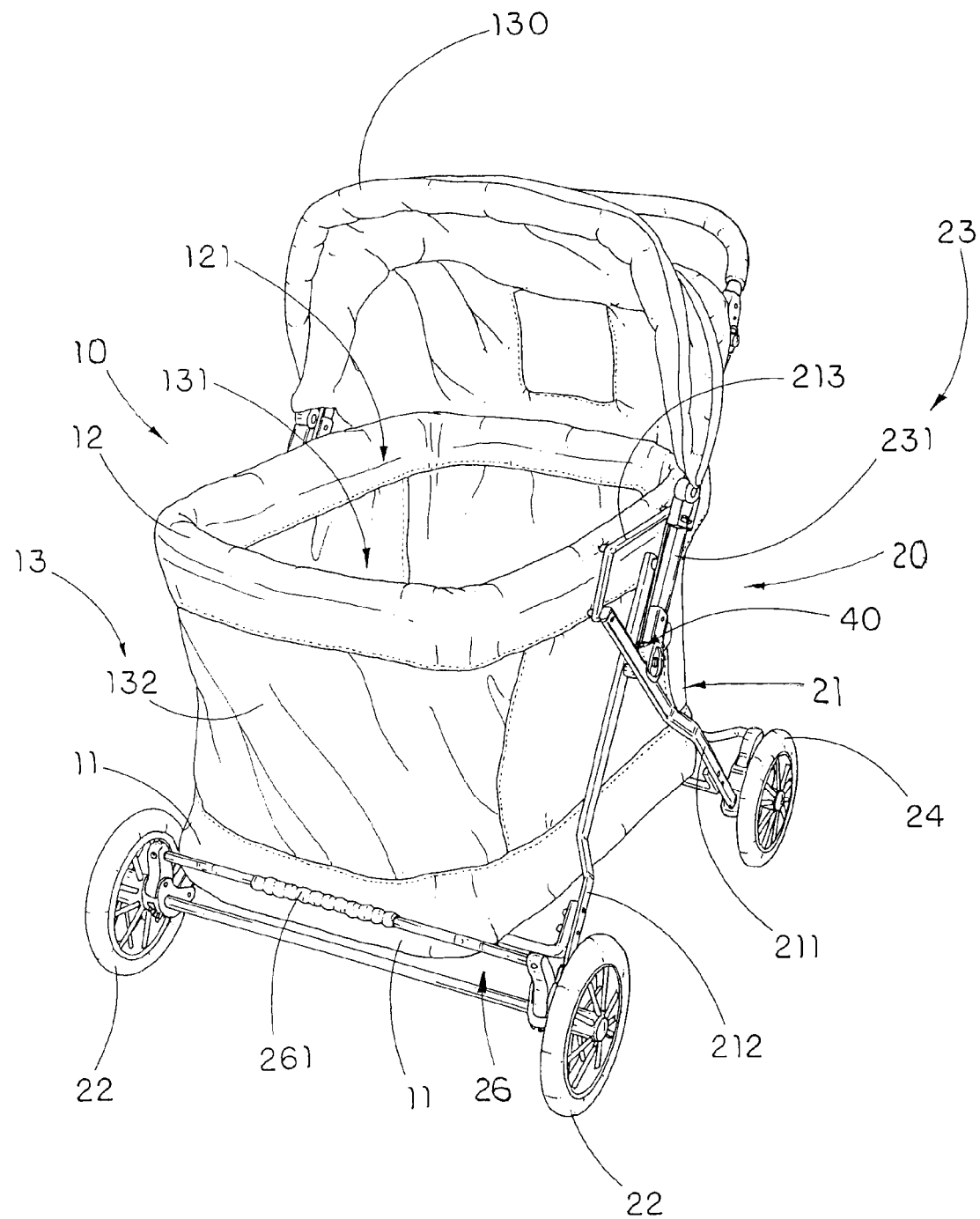
FIG. 1 is a perspective view of a sports utility stroller according to a preferred embodiment of the present invention.

Referring to FIG. 1 of the drawings, a sports utility stroller according to a preferred embodiment of the present invention is illustrated, wherein the sports utility stroller comprises a boundary frame 10 and a stroller frame 20 to support the boundary frame 10.

The boundary frame 10 comprises a bottom frame 11 having a supporting surface 111, a top frame 12, defining a top opening 121, spaced apart from the bottom frame 11 in a vertical direction, and a boundary shelter 13 supported by the top frame 12 to define a playpen cavity 131 within the boundary shelter 13, the top frame 12 and the bottom frame 11.

Figure 2:
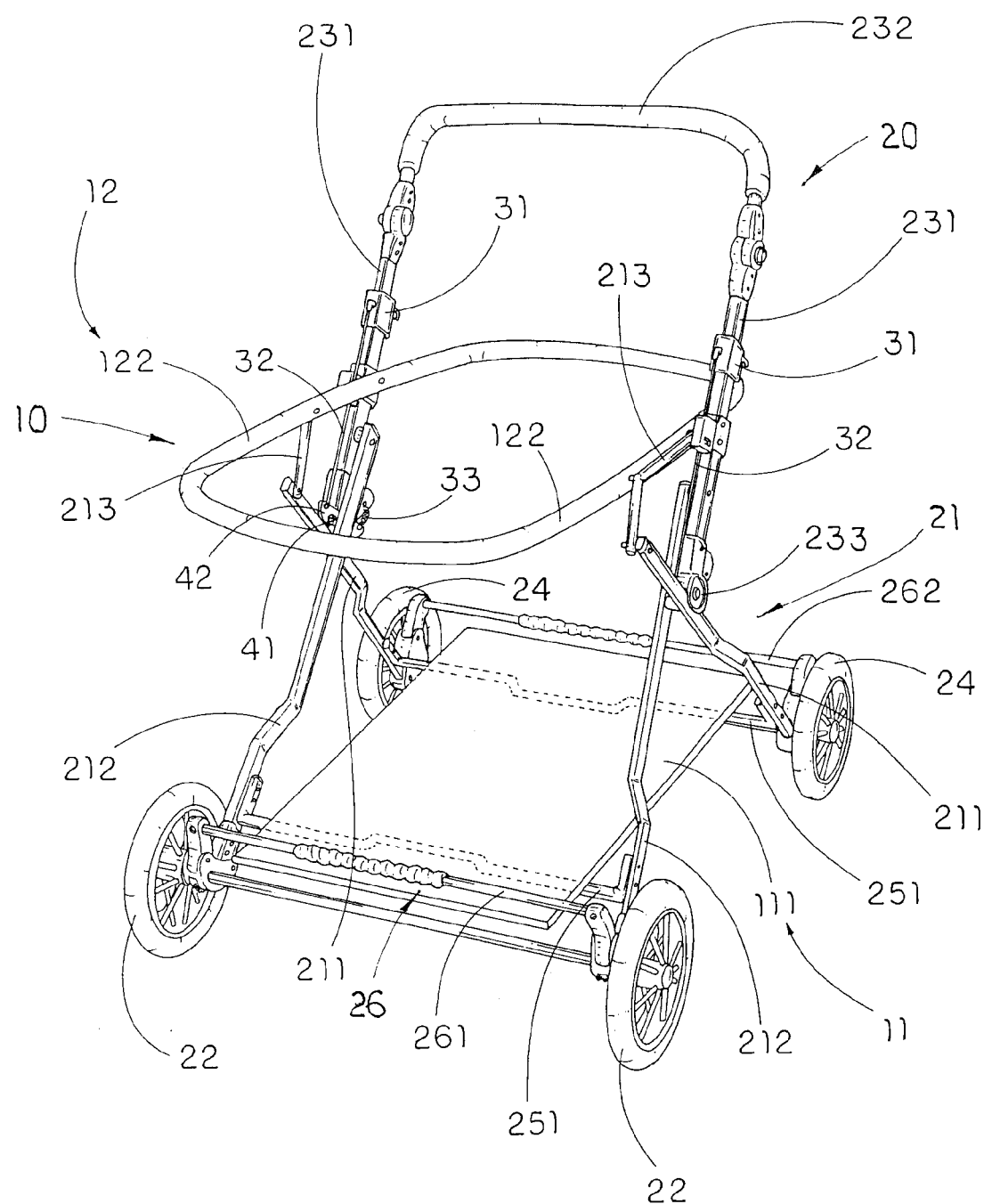
FIG. 2 is a perspective of a boundary frame mounted to a stroller frame of the sports utility stroller according to the above preferred embodiment of the present invention.

As shown in FIG. 2, the stroller frame 20 comprises a pair of side frames 21, which supports two sides of the boundary frame 10, each comprising a first side frame leg 211 and a second side frame leg 212 pivotally connected with each other in a cross manner to form a pivotal "X" structure, a pairs of front stroller wheels 22 rotatably attached to two bottom ends of the first frame legs 211, a pair of rear stroller wheels 24 rotatably attached to two bottom ends of the second frame legs 212 respectively, and a handle frame 23 comprising two handle arms 231 upwardly extended from the side frames 21 respectively.

The sports utility stroller further comprises a pair of locking arrangements 40 for securely locking up the two side frames 21 respectively so as to retain the boundary frame 10 at an unfolded position, wherein at the unfolded position, the top frame 12 is lifted up from the bottom frame 11 to form the playpen cavity 131 having a predetermined depth, and at a folded position, the first and second side frame legs 211, 212 are pivotally folded to drop the top frame 12 towards the bottom frame 11, so as to minimize the depth of the playpen cavity 131.

According to the preferred embodiment, the bottom frame 11 is constructed to form the supporting surface 111, which is made of rigid material, is adapted for substantially supporting a downward force of a weight of a child. Preferably, a cushioning layer is provided on the supporting surface 111 of the bottom frame 11 for comfortly supporting the child thereon.

The top frame 12 is constructed to have a corresponding loop structure to define the top opening 121 wherein the frame 12 is disposed above and is spaced apart from the bottom frame 11 in a vertical direction. The top frame 12 comprises two top side arms 122 extended in a parallel manner.

The boundary shelter 13 comprises a fabric made surrounding wall 132 upwardly extended from the bottom frame 11 to the top frame 12 to form the playpen cavity 131 such that the top opening 121 of the top frame 11 communicates with the playpen cavity 131. Therefore, the boundary frame 10 is adapted to be folded up by dropping the top frame 12 downwardly to the bottom frame 13 to reduce the depth of the playpen cavity 131.

It is worth mentioning that the boundary shelter 13 has a predetermined size to function as a playyard and/or bed for accommodating a baby or young child therein. Moreover, a foldable canopy 130 is supported on the top frame 12 for shading the baby under sunlight and for sheltering from drizzling.

As shown in FIG. 2, the two handle arms 231 of the handle frame 23 are pivotally connected to two upper ends of the second side frame legs 212 respectively in such a manner that bottom ends of the handle arms 231 are substantially biased against the first side frame legs 211 respectively at the unfolded position, so as to ensure the lock up position of the first and second side frame legs 211, 212. The handle frame 23 further comprises a U-shaped hand bar 232 having two ends rotatably coupling with upper ends of the two handle arms 231 respectively.

Figure 3:
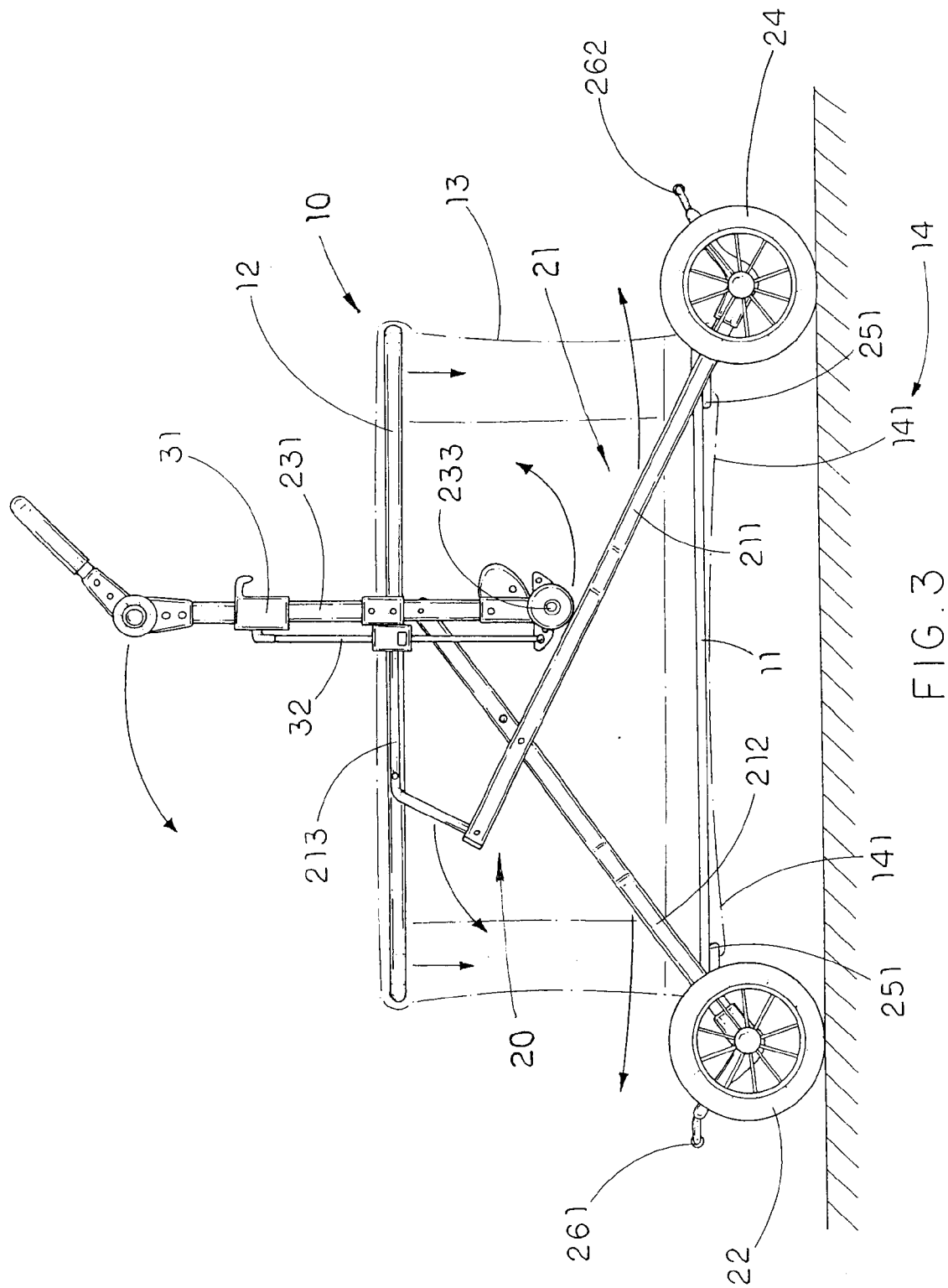
FIG. 3 is a side view of the sports utility stroller according to the above preferred embodiment of the present invention, illustrating the folding movement of the sports utility stroller.

Each of the side frames 21 further comprises a guiding arm 213 substantially attached to the respective top side arm 122 of the top frame 12 wherein the guiding arm 213 has a front end pivotally connected to an upper end of the respective first side frame leg 211 and a rear end pivotally connected to the respective handle arm 231 in such a manner that when the first and second side frame legs 211, 212 are pivotally and downwardly folded to the folded position, the pivotal movements of the first and second side frame legs 211, 212 drives the guiding arms 213 to drop the top frame 12 toward the bottom frame 11, so as to fold up the sports utility stroller, as shown in FIG. 3.

Figure 4:
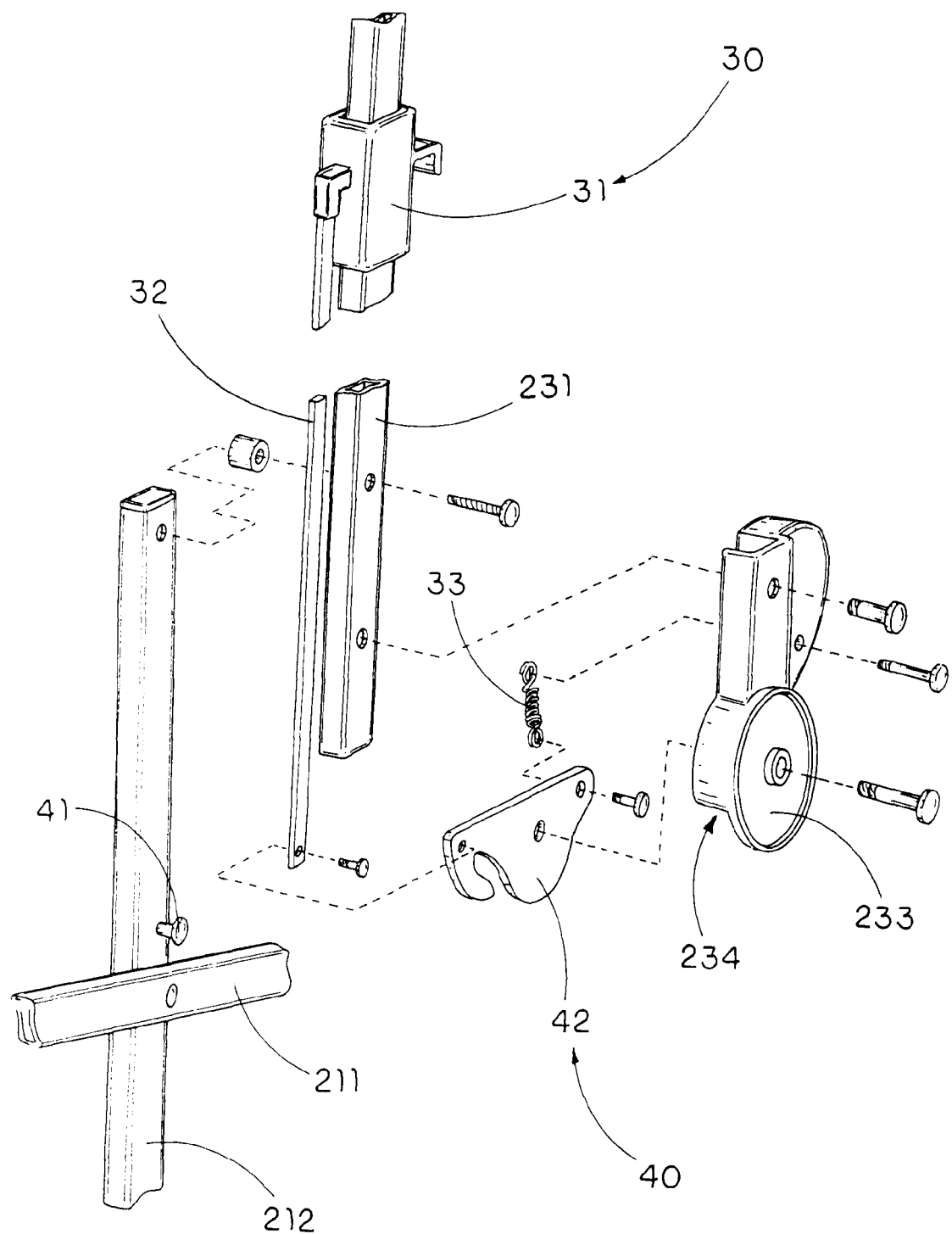
FIG. 4 is an exploded perspective view of a locker joint of the sports utility stroller according to the above preferred embodiment of the present invention.

In order to guide the bottom ends of the handle arms 231 to bias against the first side frame legs 211 at the unfolded position respectively, the handle frame 23 further comprises a pair of sliding guiders 233, each having a bottom guiding slot 234, provided at the bottom ends of the handle arms 231 respectively, as shown in FIG. 4, in such a manner that when the handle arm 231 is folded to the respective first frame leg 211, the sliding guider 233 is slid along the first side frame leg 211 by slidably receiving the first side frame 211 in the guiding slot 234, so as to guide the bottom end of the handle arm to substantially bias against the first side frame leg 211.

As shown in FIG. 4, each of the locking arrangements 40 comprises a first locking member 41 outwardly extended from the respective second side frame leg 211 at a position above a pivot joint of the first and second side frame legs 211, 212 and a second locking member 42 provided at a lower portion of the respective handle arm 231 to substantially engage with the first locking member 41 so as to securely lock up pivotal movements of the first and second side frame legs 211, 212 while the bottom end of the handle arm 231 is biased against the first side frame leg 211.

Accordingly, each of the first locking members 41 is a rivet outwardly protruded from the respective second side frame leg 212 and each of the second locking members 42 is a hook-liked member pivotally connected to the bottom portion of the respective handle arm 231 to securely hook on the rivet of the first locking member 41.

For easy operation, the utility sport stroller further comprises a pair of releasing devices 30 each of which comprises a releasing member 31 slidably mounted on the handle arm 231 and an elongated element 32 having two ends connected to the second locking member 41 and the releasing member 31 respectively in such a manner that when the releasing member 31 is slid upwardly along the respective handle frame 231 to pull the elongated member 32, the respective second locking member 42 is disengaged with the first locking member 41, so as to release the pivotal movements of the first and second side frame legs 211, 212.

Each of the releasing devices 30 further comprises a resilient element 33 for applying an urging pressure against the second locking member 42 to normally retain the second locking member 42 at a position that the second locking member 42 is engaged with the first locking member 41. Accordingly, the resilient element 33 is a compression spring having two ends attached to the second locking member 42 and the handle arm 231 respectively wherein the resilient element 33 normally urges and retain the second locking member 42 to engage with the first locking member 41, so as to ensure the first and second side frame legs 211, 212 in the locking position.

As shown in FIG. 2, the stroller frame 20 further comprises a pair of spaced apart support braces 251 transversely extended between the two side frames 21 at positions underneath the supporting surface 111 of the bottom frame 11 so as to substantially support the boundary frame 10. The support braces 251 are transversely extended between lower portions of the first side frame legs 211 and lower portions of the second side frame legs 212 respectively wherein the supporting surface 111 of the bottom frame 11 is substantially supported on the support braces 251. Therefore, a downward force of the weigh of the child applied on the supporting surface 111 of the bottom frame 11 will substantially distribute to the stroller frame 20 through the support braces 251.

For enhancing the stabilization of the boundary frame 10, the boundary frame 10 further comprises means 14 for attaching the bottom frame 11 to the support braces 251 wherein the attaching means 14 comprises a pair of tubular sleeves 141 opposedly extended from a bottom side of the supporting surface 111 of the bottom frame 11 to the support braces 251 respectively. Therefore, the tubular sleeves 141 are adapted to hold the bottom frame 11 in position so as to prevent an unwanted rocking movement of the boundary frame 10 with respect to the stroller frame 20.

The stroller frame 20 further comprises a means 26 for locking up rotational movements of the front and rear stroller wheels 22, 24 wherein the locking means 26 comprises a front locker arm 261 movably extended between the two front stroller wheels 22 and a rear locker arm 262 movably extended between the two rear stroller wheels 24. Accordingly, the front locker arm 261 has two first engaging ends releasably engaged with front wheel axles of the two front stroller wheels 22 respectively and the rear locker arm 262 has two second engaging ends releasably engaged with rear wheel axles of the two rear stroller wheels 24 respectively in such a manner that when the front and rear locker arms 261, 262 are stepped downwardly, the first and second engaging ends of the front and rear locker arms 261, 262 are securely engaged with front and rear wheel axles of the front and rear stroller wheels 22, 24 respectively, so as to substantially lock up the rotational movements of the front of the rear stroller wheels 22, 24.

It is worth mentioning that the front and rear locker arms 261, 262 are positioned at the front and rear sides of the boundary frame 10 to function as front and rear bumpers so as to prevent any collision from the front and the rear of the boundary frame 10. Moreover, when the front and rear stroller wheels 22, 24 are locked up, the boundary frame 10 becomes a playyard for accommodating the young child therein. However, by unlocking the rotational movements of the front and rear stroller wheels 22, 24, the parents are able to transport their young children by the sports utility stroller of the present invention.

Figure 5:
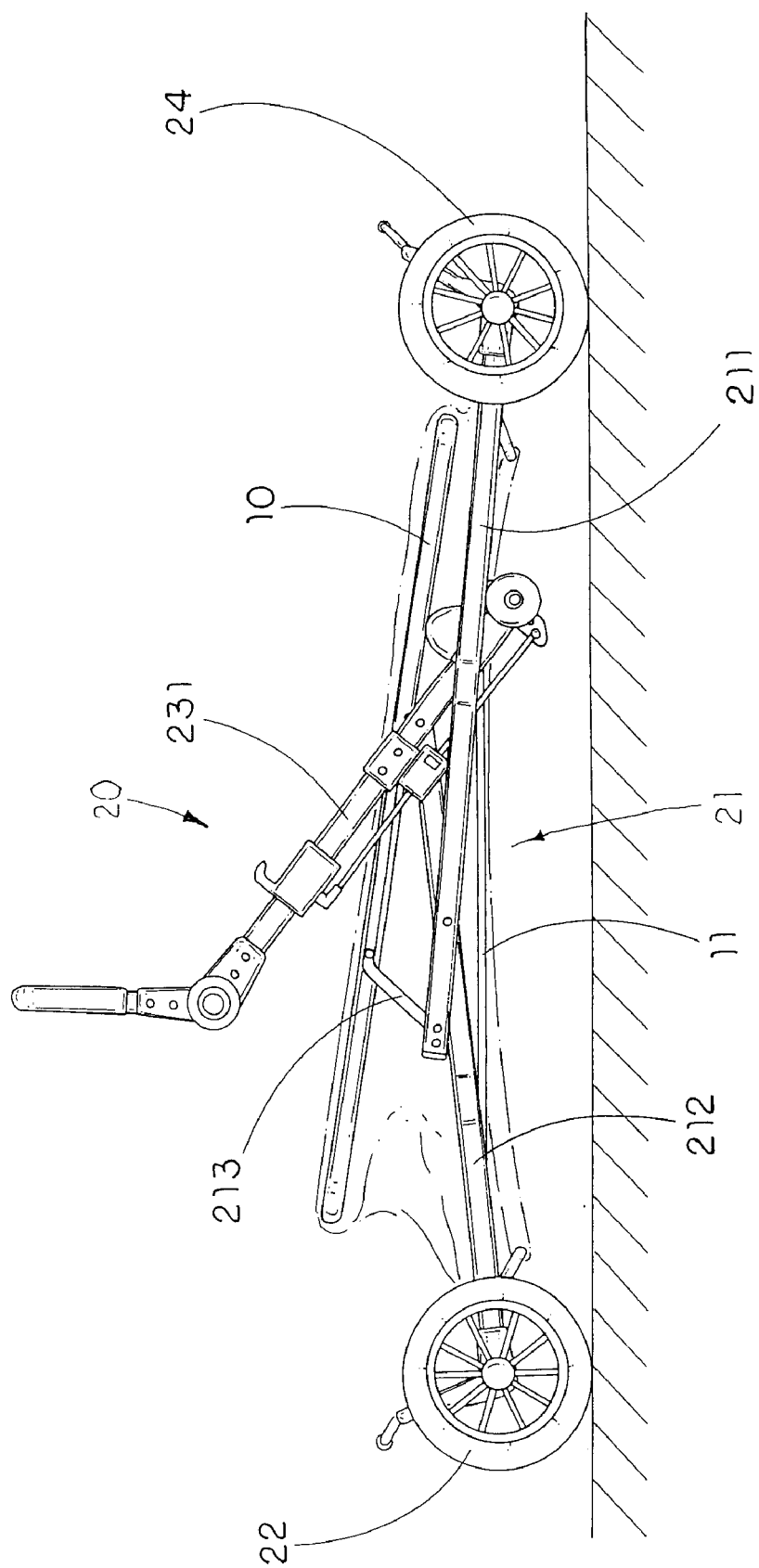
FIG. 5 is a side view of the sports utility stroller in a folded position according to the above preferred embodiment of the present invention.

In order to fold up the sports utility stroller, the parent easily releases the engagements between the first and second locking members 41, 42 by lifting up the releasing members 31. Once the second locking members 42 are disengaged with the first locking members 41, the parent is able to pivotally push the handle frame 23 frontwardly in such a manner that the frontward pivotal movement of the handle frame 23 drives the first and second side frame legs 211, 212 to collapse through the guiding arms 213, so as to fold up the boundary frame 10, as shown in FIG. 5. In other words, the folding operation of the sports utility stroller is easy and fast that an individual is able to unfold or fold up the sports utility stroller by pivotally pull up or push down the handle frame 23.

Moreover, the width of the sports utility stroller should be less than 32 inches such that the parent is able to move the sports utility stroller passing through a standard door that a width of the standard door is approximately 32 inches. In other words, the parents are able to use the present invention as the stroller to transport their babies outdoors and as the playyard for accommodating their babies once the front and rear wheels 22, 24 are locked. Thus, the sports utility stroller functions as a bassinet and/or bed that the parents are able to carry their babies from room to room indoors.

What is claimed is:

1. A sports utility stroller, comprising:
   a boundary frame, comprising:
      a bottom frame having a supporting surface;
      a top frame, defining a top opening, spaced apart from said bottom frame in a vertical direction; and
      a boundary shelter supported by said top frame to define a playpen cavity within said boundary shelter, said top frame and said bottom frame;
   a stroller frame, comprising:
      a pair of side frames, which supports two sides of said boundary frame, each comprising a first side frame leg and a second side frame leg pivotally connected with each other in a cross manner to form a pivotal "X" structure;
      a pair of front stroller wheels rotatably attached to two bottom ends of said first frame legs respectively;
      a pair of rear stroller wheels rotatably attached to two bottom ends of said second frame legs respectively; and
      a handle frame comprising two handle arms upwardly extended from said side frames respectively, wherein said two handle arms of said handle frame are pivotally connected to two upper ends of said second side frame legs respectively in such a manner that bottom ends of said handle arms are substantially biased against said first side frame legs respectively at said unfolded position, wherein said handle frame further comprises a pair of sliding guiders each having a bottom guiding slot, provided at said bottom ends of said handle arms respectively in such a manner that when said handle arm is folded to said respective first frame leg, the sliding guider is slid along said first side frame leg by slidably receiving said first side frame in said guiding slot, so as to guide said bottom end of said handle arm to substantially bias against said first side frame leg; and
      a pair of locking arrangements securely locking up said two side frames respectively so as to retain said boundary frame at an unfolded position, wherein at said unfolded position, said top frame is lifted up from said bottom frame to form said playpen cavity having a predetermined depth, and at a folded position, said first and second side frame legs are pivotally folded to drop said top frame towards said bottom frame, so as to minimize said depth of said playpen cavity.

2. A sports utility stroller, as recited in claim 1, further comprising a front locker arm, which is transversely positioned at a front side of said boundary frame, having two first engaging ends releasably engaged with front wheel axles of said two front stroller wheels respectively for securely locking up rotational movements of said front stroller wheels and a rear locker arm which is transversely positioned at a rear side of said boundary frame, having two second engaging ends releasably engaged with rear wheel axles of said two rear stroller wheels for securely locking up rotational movements of said rear stroller wheels.

3. A sports utility stroller, as recited in claim 1, wherein each of said side frames further comprises a guiding arm substantially attached to said respective side of said top frame wherein said guiding arm has a front end pivotally connected to an upper end of said respective first side frame leg and a rear end pivotally connected to said respective handle arm in such a manner that when said first and second side frame legs are pivotally and downwardly folded to said folded position, pivotal movements of said first and second side frame legs drives said guiding arms to drop said top frame toward said bottom frame, so as to fold up said sports utility stroller.

4. A sports utility stroller, as recited in claim 3, further comprising a front locker arm, which is transversely positioned at a front side of said boundary frame, having two first engaging ends releasably engaged with front wheel axles of said two front stroller wheels respectively for securely locking up rotational movements of said front stroller wheels and a rear locker arm, which is transversely positioned at a rear side of said boundary frame, having two second engaging ends releasably engaged with rear wheel axles of said two rear stroller wheels for securely locking up rotational movements of said rear stroller wheels.

5. A sports utility stroller, as recited in claim 3, wherein said stroller frame further comprises a pair of spaced apart support braces transversely extended between said two side frames at positions underneath said supporting surface of said bottom frame to substantially support said boundary frame, and a means for attaching said bottom frame to said support braces.

6. A sports utility stroller, as recited in claim 3, wherein each of said locking arrangements comprises a first locking member outwardly extended from said respective second side frame leg at a position above a pivot joint of said first and second side frame legs and a second locking member provided at a lower portion of said respective handle arm to substantially engage with said first locking member so as to securely lock up pivotal movements of said first and second side frame legs.

7. A sports utility stroller, as recited in claim 6, wherein said stroller frame further comprises a pair of spaced apart support braces transversely extended between said two side frames at positions underneath said supporting surface of said bottom frame to substantially support said boundary frame, and a means for attaching said bottom frame to said support braces.

8. A sports utility stroller, as recited in claim 6, further comprising a pair of releasing devices each of which comprises a releasing member slidably mounted on said respective handle arm and an elongated element having two ends connected to said second locking member and said releasing member respectively in such a manner that when said releasing member is slid upwardly along said respective handle frame to pull said elongated member, said respective second locking member is disengaged with said first locking member, so as to release pivotal movements of said first and second side frame legs.

9. A sports utility stroller, as recited in claim 6, further comprising a front locker arm, which is transversely positioned at a front side of said boundary frame, having two first engaging ends releasably engaged with front wheel axles of said two front stroller wheels respectively for securely locking up rotational movements of said front stroller wheels and a rear locker arm, which is transversely positioned at a rear side of said boundary frame, having two second engaging ends releasably engaged with rear wheel axles of said two rear stroller wheels for securely locking up rotational movements of said rear stroller wheels.

10. A sports utility stroller, as recited in claim 9 further comprising a pair of releasing devices each of which comprises a releasing member slidably mounted on said respective handle arm and an elongated element having two ends connected to said second locking member and said releasing member respectively in such a manner that when said releasing member is slid upwardly along said respective handle frame to pull said elongated member, said respective second locking member is disengaged with said first locking member, so as to release pivotal movements of said first and second side frame legs.

11. A sports utility stroller, as recited in claim 9, wherein said stroller frame further comprises a pair of spaced apart support braces transversely extended between said two side frames at positions underneath said supporting surface of said bottom frame to substantially support said boundary frame, and a means for attaching said bottom frame to said support braces.

12. A sports utility stroller, as recited in claim 11, further comprising a pair of releasing devices each of which comprises a releasing member slidably mounted on said respective handle arm and an elongated element having two ends connected to said second locking member and said releasing member respectively in such a manner that when said releasing member is slid upwardly along said respective handle frame to pull said elongated member, said respective second locking member is disengaged with said first locking member, so as to release pivotal movements of said first and second side frame legs.

13. A sports utility stroller, comprising:
a boundary frame, comprising:
  a bottom frame having a supporting surface;
  a top frame, defining a top opening, spaced apart from said bottom frame in a vertical direction; and
  a boundary shelter supported by said top frame to define a playpen cavity within said boundary shelter, said top frame and said bottom frame;
a stroller frame, comprising:
  a pair of side frames, which supports two sides of said boundary frame, each comprising a first side frame leg and a second side frame leg pivotally connected with each other in a cross manner to form a pivotal "X" structure, wherein each of said side frames further comprises a guiding arm substantially attached to said respective side of said top frame wherein said guiding arm has a front end pivotally connected to an upper end of said respective first side frame leg;
  a pair of front stroller wheels rotatably attached to two bottom ends of said first frame legs respectively;
  a pair of rear stroller wheels rotatably attached to two bottom ends of said second frame legs respectively; and
  a handle frame comprising two handle arms upwardly extended from said side frames respectively, wherein each of said guiding arms has a rear end pivotally connected to said respective handle arm in such a manner that when said first and second side frame legs are pivotally and downwardly folded to said folded position, pivotal movements of said first and second side frame legs drives said guiding arms to drop said top frame toward said bottom frame, so as to fold up said sports utility stroller; and
  a pair of locking arrangements securely locking up said two side frames respectively so as to retain said boundary frame at an unfolded position, wherein at said unfolded position, said top frame is lifted up from said bottom frame to form said playpen cavity having a predetermined depth, and at a folded position, said first and second side frame legs are pivotally folded to drop said top frame towards said bottom frame, so as to minimize said depth of said playpen cavity.

14. A sports utility stroller, comprising:

a boundary frame, comprising:
- a bottom frame having a supporting surface;
- a top frame, defining a top opening, spaced apart from said bottom frame in a vertical direction; and
- a boundary shelter supported by said top frame to define a playpen cavity within said boundary shelter, said top frame and said bottom frame;

a stroller frame, comprising:
- a pair of side frames, which supports two sides of said boundary frame, each comprising a first side frame leg and a second side frame leg pivotally connected with each other in a cross manner to form a pivotal "X" structure, wherein each of said side frames further comprises a guiding arm substantially attached to said respective side of said top frame wherein said guiding arm has a front end pivotally connected to an upper end of said respective first side frame leg;
- a pair of front stroller wheels rotatably attached to two bottom ends of said first frame legs respectively;
- a pair of rear stroller wheels rotatably attached to two bottom ends of said second frame legs respectively; and
- a handle frame comprising two handle arms upwardly extended from said side frames respectively, wherein said two handle arms of said handle frame are pivotally connected to two upper ends of said second side frame legs respectively in such a manner that bottom ends of said handle arms are substantially biased against said first side frame legs respectively at said unfolded position, wherein each of said guiding arms has a rear end pivotally connected to said respective handle arm in such a manner that when said first and second side frame legs are pivotally and downwardly folded to said folded position, pivotal movements of said first and second side frame legs drives said guiding arms to drop said top frame toward said bottom frame, so as to fold up said sports utility stroller; and
- a pair of locking arrangements securely locking up said two side frames respectively so as to retain said boundary frame at an unfolded position, wherein at said unfolded position, said top frame is lifted up from said bottom frame to form said playpen cavity having a predetermined depth, and at a folded position, said first and second side frame legs are pivotally folded to drop said top frame towards said bottom frame, so as to minimize said depth of said playpen cavity.

15. A sports utility stroller, as recited in claim 14, wherein each of said locking arrangements comprises a first locking member outwardly extended from said respective second side frame leg at a position above a pivot joint of said first and second side frame legs and a second locking member provided at a lower portion of said respective handle arm to substantially engage with said first locking member so as to securely lock up pivotal movements of said first and second side frame legs.

* * * * *